Oct. 28, 1924.  
A. V. DOUGLAS  
1,513,037  
RUBBER STORAGE BATTERY BOX  
Filed Oct. 17, 1923
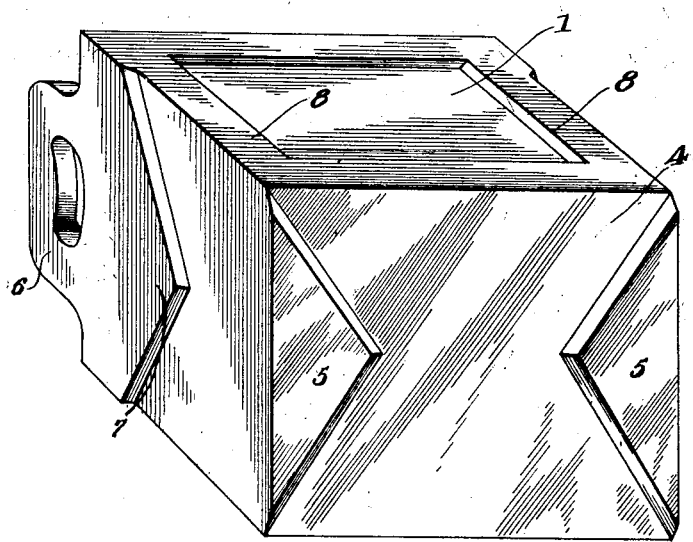
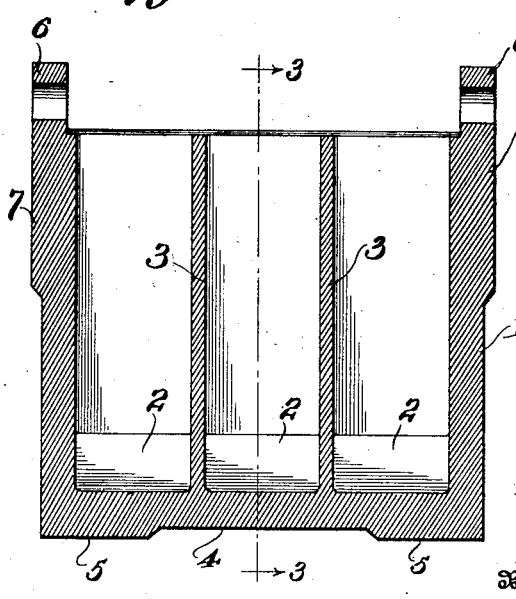
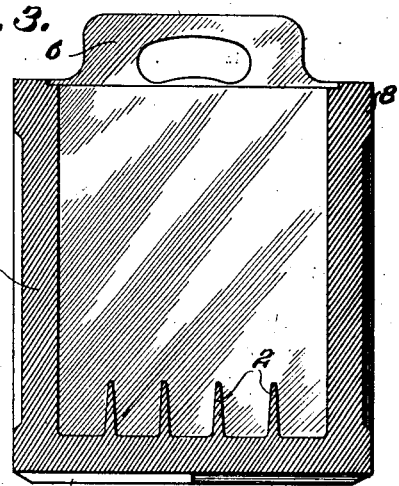
Inventor
Adam V. Douglas.
By Wm. Fletcher & Co.

Patented Oct. 28, 1924.

1,513,037

UNITED STATES PATENT OFFICE.

ADAM V. DOUGLAS, OF PARIS, KENTUCKY.

RUBBER STORAGE-BATTERY BOX.

Application filed October 17, 1923. Serial No. 669,107.

*To all whom it may concern:*

Be it known that I, ADAM V. DOUGLAS, citizen of the United States of America, residing at Paris, in the county of Bourbon and State of Kentucky, have invented certain new and useful Improvements in Rubber Storage-Battery Boxes; and I do hereby declare the following to be a full, clear, and exact description of the invention, such as will enable others skilled in the art to which it appertains to make and use the same.

This invention relates to improvements in storage battery boxes or cases, and more especially to an integral construction of battery box formed from rubber.

An object of the invention is to provide an integral construction of rubber to form a storage battery box, which will be so made as to provide a reinforcement wherever the most wear will occur on the box.

Another object of the invention is to provide a storage battery box which will be made of rubber and of integral formation, and to further provide the bottom and sides of the box with an extra thickness of rubber to thoroughly reinforce the said box where wear occurs the most.

A further object of the invention is to provide an integrally formed rubber storage battery box which will be highly efficient in use and quite inexpensive to manufacture.

Other objects will appear as the description proceeds.

In the accompanying drawings which form a part of my application,

Fig. 1 is a perspective view of my improved rubber battery box showing the reinforced bottom and side areas, Fig. 2 is a longitudinal sectional view of the box, and Fig. 3 is a transverse sectional view of the box.

Like characters of reference are used throughout the following specification and the accompanying drawings to designate corresponding parts.

My invention consists in the forming of a rubber storage battery box 1 of integral construction, which will be provided with the usual form of bridging 2 in the lower portion of the box, and the cell dividing plates 3, which divide the box into the several compartments for receiving the cell elements.

On the lower portion or bottom 4 of the box I provide at the opposite ends thereof, the thickened oppositely disposed and inwardly extending reinforcing areas 5, which are so positioned as to seat down on the usual supporting straps for the battery box in an automobile.

The handles 6 are also of thicker formation and have downwardly extending reinforcing areas 7 at the opposite ends of the box 1 so positioned as to proportion the strain when lifting the battery box from its container or socket, so that the handles 6 will not readily be broken off.

The corners 8 of the box are also reinforced to form a sturdy construction which will insure the long life of the box.

It is known by me that it is old in the art to form storage battery boxes from rubber, and to form the same integrally. It is, however, my invention to form an integral construction of storage battery box from rubber and to so reinforce the said box that the places which usually receive the most wear will be of a decidedly thicker construction, which will greatly add to the usefulness and long life of the box.

Many minor changes in detail of construction may be resorted to without departure from the spirit of the invention.

Having thus described my invention, what I claim as new and desire to secure by Letters Patent of the United States is—

In an integrally formed rubber storage battery box, the combination of a bottom, side, and end walls, of a pair of reinforced handles integrally formed at the opposite ends of said box, said box being provided with reinforced integrally formed areas on the bottom and ends of said box, where the same contracts with the usual type of box holder:

In testimony whereof I affix my signature in presence of two witnesses.

ADAM V. DOUGLAS.

Witnesses:
 GRACE HASKINS,
 PEARCE PATON.